Nov. 11, 1947.　　　S. B. HASELTINE　　　2,430,506
LOCKING MEANS FOR RAILWAY CAR HAND BRAKES
Filed Feb. 7, 1946　　　2 Sheets-Sheet 1
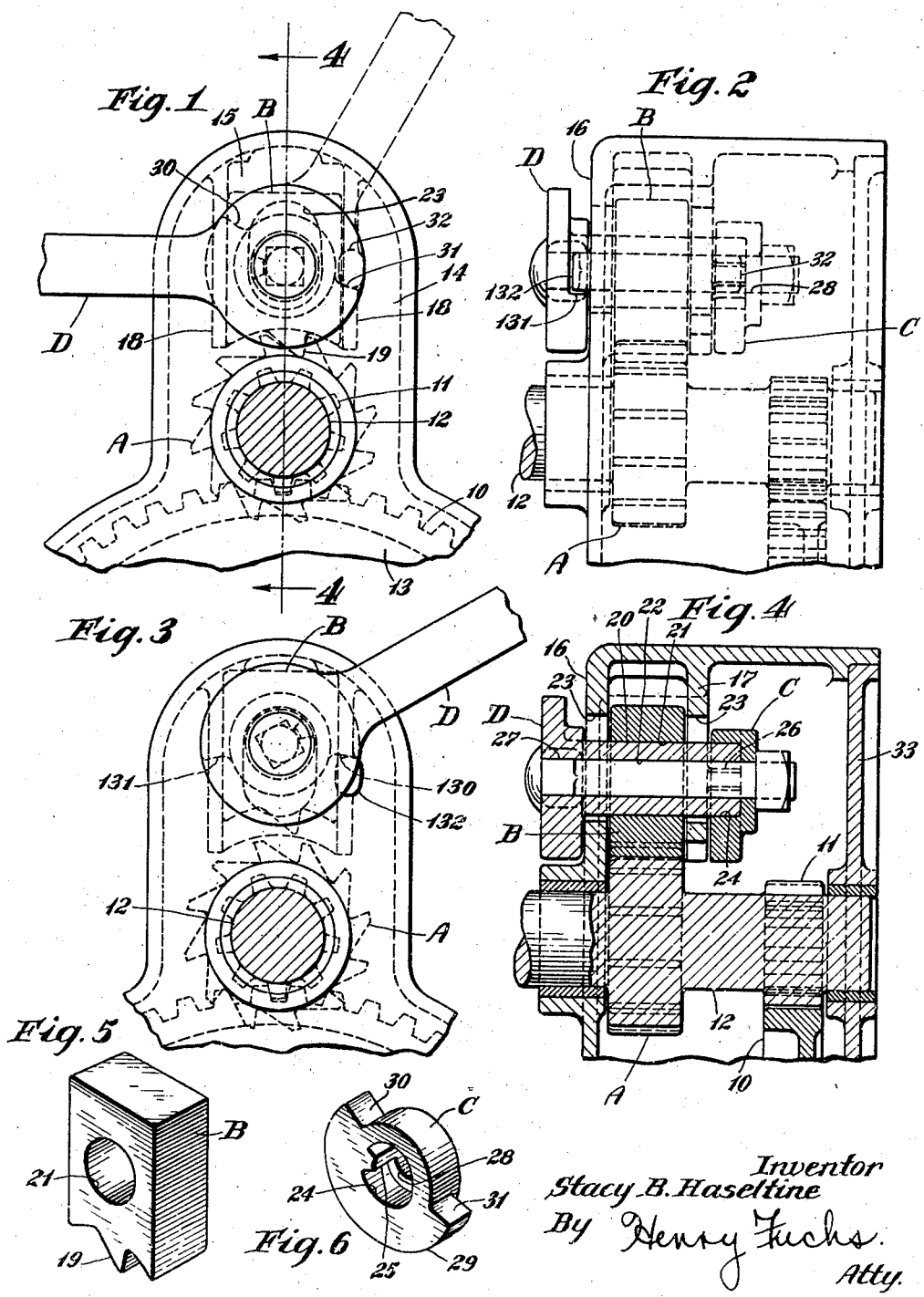
Inventor
Stacy B. Haseltine
By Henry Fuchs
Atty.

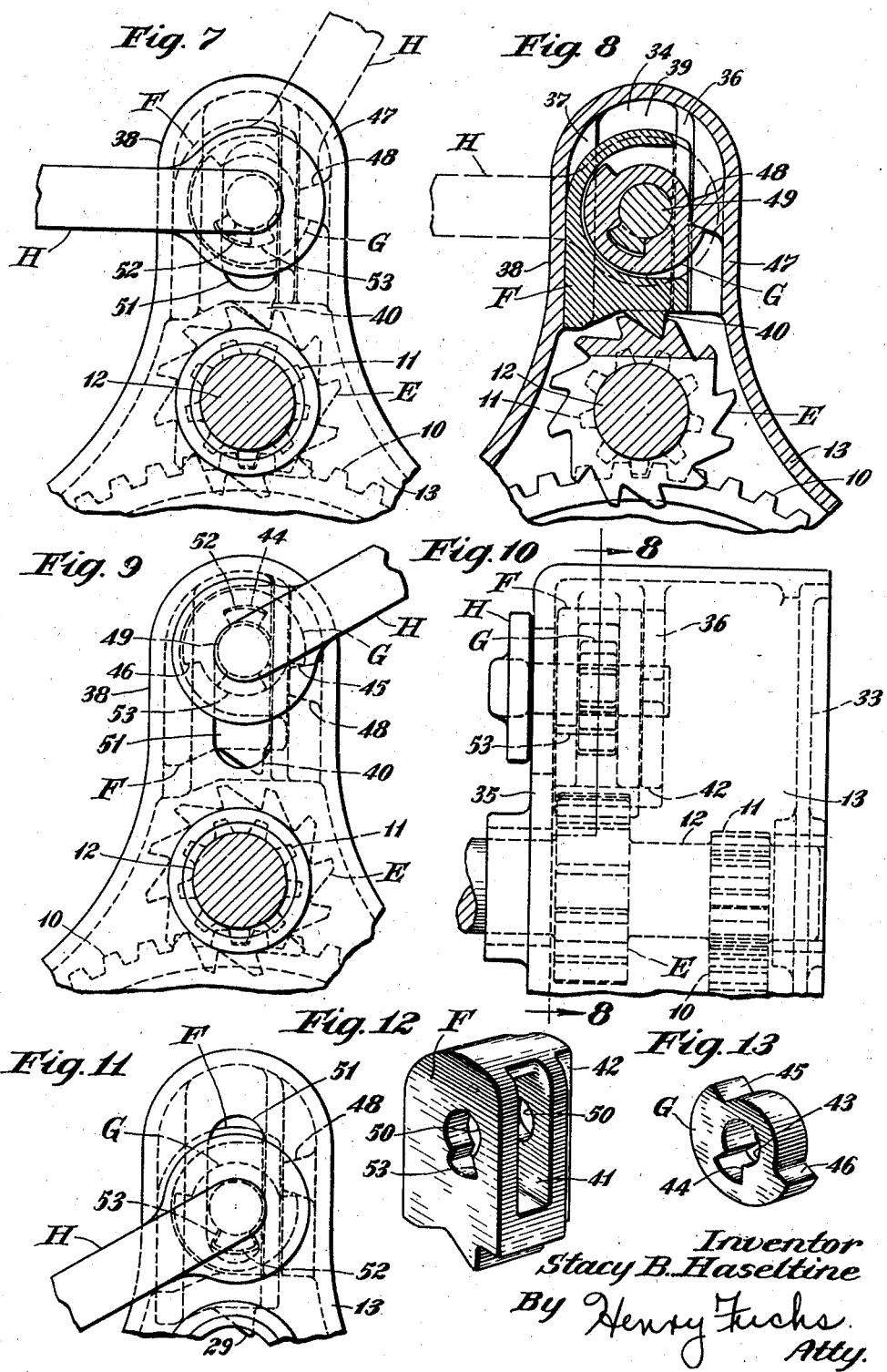

Patented Nov. 11, 1947

2,430,506

UNITED STATES PATENT OFFICE 2,430,506

LOCKING MEANS FOR RAILWAY CAR HAND BRAKES

Stacy B. Haseltine, La Grange, Ill., assignor to W. H. Miner, Inc., Chicago, Ill., a corporation of Delaware Application February 7, 1946, Serial No. 645,990

11 Claims. (Cl. 188—81.1)

This invention relates to improvements in hand brakes for railway cars.

One object of the invention is to provide a hand brake mechanism of the power multiplying, gear operated type, especially adapted for railway cars, comprising a ratchet and cooperating locking dog for holding the mechanism against movement in brake releasing direction, wherein the dog is slidable toward and away from the ratchet wheel to engage the same therewith and disengage it therefrom, and the dog is forcibly engaged with said ratchet wheel and disengaged therefrom by a trip element which is lever operated.

A further object of the invention is to provide a mechanism as set forth in the preceding paragraph wherein the lever actuated trip element is in the form of a rotary member having shouldered engagement with a fixed stop abutment to effect bodily movement thereof toward and away from the ratchet wheel upon said lever being swung in reverse directions, and is operatively connected to the dog to effect movement of the latter in unison therewith toward and away from the ratchet wheel, to operatively engage the dog with the wheel and disengage the same therefrom.

A more specfic object of the invention is to provide a hand brake mechanism of the power multiplying type, comprising a chain winding drum, a gear rotatable with the drum, a driving pinion meshing with the gear, a ratchet wheel rotatable with the pinion, a locking dog cooperating with said ratchet wheel and guided for sliding, reciprocating movement toward and away from said wheel, and a lever operated, rotary trip element for moving said dog toward and away from said wheel into and out of engagement therewith, wherein the rotary trip element is connected to said dog for bodily movement therewith toward and away from the ratchet wheel and cooperates with fixed abutment means which it engages when rotated in reverse directions to effect movement of the same and the dog toward and away from the ratchet wheel.

Other objects of the invention will more clearly appear from the description and claims hereinafter following.

In the drawings forming a part of this specification, Figure 1 is an elevational view of the upper end portion of a gear operated hand brake mechanism, illustrating my improvements in connection therewith, the operating shaft being shown in vertical section. Figure 2 is a side elevational view, looking from right to left in Figure 1. Figure 3 is a view, similar to Figure 1, showing the parts of the mechanism in somewhat different position. Figure 4 is a vertical sectional view, corresponding substantially to the line 4—4 of Figure 1. Figures 5 and 6 are detail perspective views, respectively, of the sliding dog and the trip element of my improved mechanism illustrated in Figures 1, 2, 3, and 4. Figure 7 is a view, similar to Figure 1, illustrating another embodiment of the invention. Figure 8 is a vertical sectional view, corresponding substantially to the line 8—8 of Figure 10. Figure 9 is a view, similar to Figure 7, showing the parts of the mechanism in a different position. Figure 10 is a side elevational view of Figure 7, looking from right to left in said figure. Figure 11 is a view, similar to Figure 7, partly broken away, illustrating the manner of assembling certain parts of my improved mechanism. Figures 12 and 13 are detail perspective views, respectively of the sliding dog and the trip element of my improved mechanism illustrated in Figures 7, 8, 9, and 10.

In the drawings, my improvements are illustrated in connection with a well-known type of gear driven, power multiplying hand brake mechanism, in which the usual brake chain is wound on a brake drum, not shown, rotatable with a relatively large gear 10, driven by a pinion 11 fixed to and preferably integral with a shaft 12 which is actuated in a well-known manner by the usual hand wheel, not shown. As is common practice, the operating parts of the hand brake mechanism are enclosed in a housing 13, the upper portion only of which is shown in the drawings.

Referring first to the embodiment of the invention illustrated in Figures 1 to 6 inclusive, my improvements comprise broadly a ratchet wheel A rotatable with the pinion 11; a sliding locking dog B; a trip element C; and an operating lever D fixed to the trip element for actuating the latter.

The ratchet wheel A and the locking dog B are contained within an upstanding chamber portion 14 of the housing 13, and the operating lever D is mounted exteriorly of the housing.

The locking dog B, which cooperates with the ratchet wheel A is slidingly supported above the ratchet wheel in a guideway 15, defined by the front wall 16 of the housing and vertical walls 17 and 18—18 depending from the top wall of the housing, the wall 17 being in a plane parallel to the wall 16 and forming the back wall of said guideway. The walls 18—18, which form the side walls of the guideway 15 are parallel and laterally spaced apart and guide the dog B for vertical movement.

As shown most clearly in Figure 5, the dog B is in the form of an oblong, rectangular block having a ratchet tooth 19 at its lower end adapted to engage with the teeth of the ratchet wheel A.

The operating lever D has a laterally extending stub shaft member 20 at its lower end formed integral therewith and journaled for rotary movement in a transverse bearing opening 21 provided in the dog B. The operating lever is thus supported at its lower end for swinging movement. The shaft member 20 is preferably hollow, being provided with a central bore 22 which also extends through the lever D. As shown most clearly in Figure 4, the wall 16 of the housing, which forms the front wall of the guideway 15 and the back wall 17 of the guideway are provided with transversely aligned, vertical slots 23—23 within which the shaft member 20 is accommodated for vertical movement. The shaft member 20 is of such a length that it projects inwardly beyond the back wall 17 of the guideway 15 to accommodate the trip element C thereon.

The trip element C, which is in the form of a disclike collar, is fixed to the inner end of the shaftlike member 20 of the lever D, being provided with a central opening 24 which extends partly therethrough and forms a socket within which the end of the shaft member 20 fits. To lock the element C against rotation with respect to the shaft member 20, the former is formed with a lengthwise extending, keylike rib 25, which is engaged in a seat 26 of the shaft member 20. The trip element C is fixed to the lever D by a retainer bolt 27, which extends through the bore 22 of the shaft member 20 and the lever D, and an aligned opening 28 provided in the element C, the head of the bolt being shouldered against the lever D and the nut thereof bearing on the outer side of the element C. The element C is further provided with a laterally projecting flange 29, which extends partly therearound, thus providing a pair of circumferentially spaced shoulders 30 and 31 which cooperate with a fixed stop or abutment 32 in the form of a projecting lug on the rear wall 17 of the guideway 15. As shown in Figures 1, 2, and 3, the operating handle lever D is preferably also provided with a pair of circumferentially spaced shoulders 130 and 131 in alignment with the shoulders 30 and 31 of the element C and the front wall 16 of the housing is provided with an outwardly projecting lug 132 or stop in alignment with the lug 32 with which the shoulders 130 and 131 cooperate. The lugs 32 and 132 are located respectively in the path of movement of the shoulders 30 and 31 of the trip element C and in the path of movement of the shoulders 130 and 131 of the lever D.

As shown most clearly in Figure 4, the operating shaft 12, which carries the pinion 11 and the ratchet wheel A, extends through the front wall 16 of the housing and is supported at its rear end by the rear wall 33 of the housing, which wall is in the nature of a removable cover plate. These walls have aligned bearing openings for supporting the operating shaft, each opening being lined with a suitable bushing, as clearly shown in Figure 4.

As will be evident, the several parts of the brake mechanism must be assembled within the housing before the cover platelike rear wall 33 is applied, and when the latter has been applied and is in fixed position it serves to hold the shaft 12 in place by engagement of the same within the bearing opening of said wall. In assembling the parts, the operating lever D is attached to the locking dog B after the latter has been placed within the guideway 15, by entering the stub shaft member 20 of the operating lever through the opening or slot 23 of the front wall of the housing and engaging said stem through the bearing opening 21 of the dog. The trip element C is then placed in position on the inner end of the stub shaft 20 and is secured to the operating lever, as well as the shaft 20, by the bolt 27.

The operation of my improved hand brake mechanism shown in Figures 1 to 6 inclusive is as follows: In applying the brakes, the ratchet wheel is rotated in clockwise direction, as viewed in Figure 1, the dog B ratcheting over the teeth of the same, being yieldingly held in engagement with the teeth by the action of gravity on the dog B and the added weight of the lever D, which, acting through the element C, in effect, fulcrums on the abutment lug 32 by engagement of the shoulder 31 of the trip element with the underneath side of said lug and also fulcrums directly on the lug 132 by engagement of the shoulder 131 of the lever with the underneath side of said lug. To release the brakes, the lever D is swung to the right until the shoulder 30 of the element C rests against the top side of the lug 32 and the shoulder 130 of the lever rests on the lug 132. This position of the lever is indicated in dotted lines in Figure 1. Upon relieving the pressure on the tooth of the dog by slightly tightening the brakes, that is, rotation of the ratchet wheel in clockwise direction, the weight of the lever D, in its overbalanced position, automatically forces the dog to slide upwardly, disengaging the same from the ratchet wheel, as shown in Figure 3. The dog B may also be forcibly disengaged from the ratchet wheel by manually swinging the lever D to the position shown in Figure 3 without slight tightening of the brakes. To reengage the dog with the ratchet wheel, the lever D is swung from the position shown in Figure 3 to the left, to the position shown in Figure 1, thereby engaging the shoulder 31 of the trip element C with the fixed abutment lug 32 and the shoulder 131 of the lever with the shoulder 132 and forcing the dog to slide downwardly into engagement with the teeth of the ratchet wheel.

Referring next to the embodiment of the invention illustrated in Figures 7 to 13 inclusive, my improvements comprise broadly a ratchet wheel E; a locking dog F; a trip element G; and an operating handle lever H fixed to the trip element for actuating the latter.

The ratchet wheel E is in all respects similar to the ratchet wheel A hereinbefore described and is mounted in the same manner, being integral with the driving shaft 12, which also carries the pinion which meshes with the gear through which the brake drum is driven. The shaft 12, as shown in Figures 7 to 11 inclusive, is mounted in the same manner as the shaft 12 illustrated in Figures 1 to 4 inclusive, being supported in bushings provided in openings in the front and rear walls of the housing. As shown, the rear wall of the housing is removable in the same manner as the wall 33 of the housing shown in Figures 1 to 4 inclusive, and is also indicated by 33.

The locking dog F is slidingly supported above the ratchet wheel in a guideway 34 defined by the front wall 35 of the housing, depending, vertically disposed, laterally spaced webs 36 and 37 projecting from the side walls of the housing and merging with the top wall thereof, and a side wall 38 which forms the left hand side wall of the housing, as seen in Figures 7, 8, 9, and 10. The opening between the webs 36 and 37 forms a guide slot 39 for a purpose hereinafter pointed out.

The dog F has a tooth 40 at its bottom end cooperating with the teeth of the ratchet wheel E in the usual manner. The body portion of the dog F is provided with a transverse opening 41 therethrough, adapted to accommodate the trip element G. As hereinbefore stated, the dog is mounted within the guideway 34 and slidingly fits within the same. This dog is further provided with a vertically extending guide projection or rib 42 on its rear side, which is relatively wide, and slidingly fits the guide slot 39 defined by the opposed vertical edges of the webs 36 and 37, thus restricting the dog to reciprocation in a vertical direction.

The trip element G, which is accommodated in the opening 41 of the dog F is in the form of a disclike collar having a central bore 43 therethrough, provided with a key slot 44. The element G is otherwise similar to the trip element C hereinbefore described, being provided with circumferentially spaced shoulders 45 and 46 similar to the shoulders 30 and 31 of the trip element C and functioning in a like manner, by cooperating with a fixed stop to lift and depress the dog. As shown in Figures 7, 8, 9, and 11, the side wall at the right hand side of the housing, which wall is indicated by 47, is provided with an inwardly projecting lug 48, which is in the path of movement of the shoulders 45 and 46 of the trip element G and acts as an abutment member to reciprocate the trip element. The trip element is actuated by the lever H, which has a laterally projecting stub shaft member 49 at its lower end formed integral therewith and journaled for rotary movement in transverse bearing openings 50—50 provided in the dog at opposite sides of the opening 41 thereof. The front wall 35 of the housing, which also forms the front wall of the guideway 34 is provided with a vertical slot 51 within which the shaft member 49 is accommodated for vertical movement. The shaft 49 extends entirely through the dog F and is provided between its ends with a relatively short, lengthwise extending rib forming an integral key member 52, which is seated in the key slot 44 of the trip element G to lock the latter to the shaft for rotation therewith. In order to provide clearance for the passage of the key member 52 of the shaft 49 in assembling the lever H with the dog, the bearing opening 50 at the forward side of the dog is downwardly enlarged by the provision of a recess 53 through which the key member may freely pass.

In assembling the parts of the mechanism shown in Figures 7 to 13 inclusive, the dog F, with the trip element G disposed in the opening thereof, is placed within the guideway 34 and the lever attached thereto before the shaft 12, carrying the ratchet wheel E and the driving pinion 11, is placed in position. As will be evident, with the ratchet wheel absent, as shown in Figure 11, the dog may be lowered to a position somewhat below that which it occupies when in operative engagement with the ratchet wheel, that is, when resting on said wheel. With the dog F thus lowered, as shown in Figure 11, the trip element is turned to such a position that the key slot 44 thereof is aligned with the recess 53 of the opening 50 of the dog. The lever H is then applied by inserting the shaft member 49 thereof within the openings 50—50 of the dog and the opening 43 of the trip element, engaging the key member 52 within the key slot 44. The dog F is then lifted sufficiently to permit the shaft 12 with its integral ratchet wheel to be placed in position. This brings the parts to the position shown in Figure 7 with the trip element and the attached shaft member 49 of the lever H turned to such a degree that the shaft member is locked against endwise removal by shouldering of its integral key member 52 against the side wall of the opening 41 of the dog, the key having been displaced beyond its position of alignment with the recess 53 by rotation of the trip element, which has been turned by engagement of the shoulder 46 thereof, with the fixed lug 48. As will be evident, after the parts have been thus assembled, removal of the lever shaft member 49 from the dog F and the trip element G is possible only by first removing the shaft 12 so that the dog may be lowered, the shaft member 49 being held against removal in all operative positions thereof, rotation of the same being limited to such an extent by the lug 48 and the cooperating shoulders 45 and 46 of the trip element that alignment of the key slot 44 and the recess 53 cannot be effected.

The operation of the mechanism illustrated in Figures 7 to 13 inclusive is substantially the same as that of the mechanism hereinbefore described in connection with Figures 1 to 6 inclusive, the lever H being thrown to the right from the full line position shown in Figure 7 to the full line position shown in Figure 9 to release the brakes, the dog F being lifted out of engagement with the ratchet wheel by the fulcruming action of the shoulder 45 of the trip element G on the abutment lug 48. The weight of the lever H may also be utilized to provide for automatic disengagement of the locking dog by swinging the lever to the dotted line position shown in Figure 7, with the shoulder 45 resting against the lug 48, and slightly tightening the brakes to release the pressure on the tooth of the dog, whereupon the weight of the lever acts to lift the dog out of engagement with the ratchet wheel. To force the dog into operative engagement with the ratchet wheel, the lever is swung to the left to the full line position shown in Figure 7, thereby depressing the dog through the fulcruming engagement of the shoulder 46 of the trip element with the fixed stop lug 48. As the ratchet wheel is rotated to tighten the brakes in applying the same, the dog ratchets over the teeth of the ratchet wheel, being yieldingly held in its engaging position by the action of gravity on the dog and the added weight of the lever H which is fulcrumed on the abutment lug 48 through the shoulder 46 of the trip element.

I claim:

1. In a hand brake mechanism, the combination with a member adapted to be rotated to tighten the brakes; of a ratchet wheel rotatable with said member; a sliding locking dog engageable with said ratchet wheel; a lever operated trip element rotatably supported on said dog; a fixed abutment element; and cooperating means on said trip element and fixed abutment element for throwing the dog into and out of engagement with the ratchet wheel when said lever is swung in reverse directions, comprising a lug on one of said elements and a pair of spaced shoulders on the other element cooperating with said lug.

2. In a hand brake mechanism, the combination with a member adapted to be rotated to tighten the brakes; of a ratchet wheel rotatable with said member; a sliding locking dog engageable with said ratchet wheel; means for guiding said dog for sliding movement toward and away from said ratchet wheel; a lever operated rotary trip element mounted on said dog for sliding movement in unison therewith; a fixed abutment element; and cooperating means on said trip element and fixed abutment element for throwing the dog into and out of engagement with the ratchet wheel when said lever is swung in reverse directions, comprising a lug on one of said elements and a pair of spaced shoulders on the other element cooperating with said lug.

3. In a hand brake mechanism, the combination with a member adapted to be rotated to tighten the brakes; of a ratchet wheel rotatable with said member; a sliding locking dog engageable with said ratchet wheel; guide means for slidably guiding said dog toward and away from the ratchet wheel; an operating lever; a laterally projecting bearing shaft member at one end of the lever for swingingly supporting the same; bearing means on said dog for rotatably supporting said shaft; a trip element fixed to the shaft for rotation therewith; a fixed abutment element; and cooperating means on said trip element and abutment element for sliding said dog into and out of engagement with the ratchet wheel when said lever is swung in reverse directions, comprising a lug on one of said elements and a pair of spaced shoulders on the other element cooperating with said lug.

4. In a hand brake mechanism, the combination with a member adapted to be rotated to tighten the brakes; of a ratchet wheel rotatable with said member; a sliding locking dog engageable with said ratchet wheel; a lever having a cylindrical bearing projection at one end journaled in a transverse bearing opening in said dog to support said lever for swinging movement; a rotary trip element fixed to said bearing projection and rotatable therewith; a fixed abutment element; and cooperating means on said trip element and fixed abutment element for throwing the dog into and out of engagement with the ratchet wheel when said lever is swung in reverse directions, comprising a lug on one of said elements and a pair of spaced shoulders on the other element cooperating with said lug.

5. In a hand brake mechanism, the combination with a member adapted to be rotated to tighten the brakes; of a ratchet wheel rotatable with said member; a sliding locking dog engageable with said ratchet wheel; a trip element; a shaft fixed to said trip element and rotatably journaled in said dog; a fixed abutment element; cooperating means on said trip element and fixed abutment element for effecting sliding movement of said dog, comprising a lug on one of said elements and a pair of spaced shoulders on the other element cooperating with said lug; and a swinging operating lever fixed to said shaft for rotating the trip element in reverse directions to respectively force said shoulders against said lug and move the dog toward and away from said ratchet wheel.

6. In a hand brake mechanism, the combination with a member adapted to be rotated to tighten the brakes; of a ratchet wheel rotatable with said member; a sliding locking dog engageable with said ratchet wheel; a lever operated trip element rotatably supported on said dog, said trip element having circumferentially spaced shoulders thereon; a fixed abutment lug in the path of movement of the shoulders of the trip element with which said shoulders are engageable to effect reciprocation of said dog.

7. In a hand brake mechanism, the combination with a member adapted to be rotated to tighten the brakes; of a ratchet wheel rotatable with said member; a sliding locking dog engageable with said ratchet wheel; means for guiding said dog for sliding movement toward and away from said ratchet wheel; a rotary trip element mounted on said dog for sliding movement in unison therewith; a swinging lever for rotating said trip element; circumferentially spaced shoulders on said trip element; and a fixed stop lug in the path of movement of said shoulders of the trip element adapted to be engaged by said shoulders when said lever is swung in reverse directions for throwing said dog into and out of engagement with the ratchet wheel.

8. In a hand brake mechanism, the combination with a member adapted to be rotated to tighten the brakes; of a ratchet wheel rotatable with said member; a sliding locking dog engageable with said ratchet wheel; guide means for slidably guiding said dog toward and away from the ratchet wheel; an operating lever; a laterally projecting bearing shaft member at one end of said lever for swingingly mounting the same; bearing means on said dog for rotatably supporting said shaft; a trip element fixed to said shaft, said trip element having circumferentially spaced shoulders; and a fixed abutment lug in the path of movement of said shoulders of the trip element and engageable by said shoulders for reciprocating said dog when the trip element is rotated by said lever.

9. In a hand brake mechanism, the combination with a member adapted to be rotated to tighten the brakes; of a ratchet wheel rotatable with said member; a sliding locking dog engageable with said ratchet wheel; a lever having a laterally extending shaft member at one end for supporting said lever for swinging movement, said shaft extending through said dog and being rotatably supported therein; a rotary trip element fixed to the outer end of said shaft member, said trip element having circumferentially spaced shoulders; and a fixed abutment lug in the path of movement of said shoulders of the trip element and engageable by said shoulders during rotation of the trip element to effect sliding movement of said dog toward and away from the ratchet wheel.

10. In a hand brake mechanism, the combination with a member adapted to be rotated to tighten the brakes; of a ratchet wheel rotatable with said member; a sliding locking dog engageable with said ratchet wheel; a lever having a laterally extending shaft member at one end thereof for supporting said lever for swinging movement, said shaft member extending through said dog and being rotatably supported therein; a pocket in said dog through which said shaft member extends; a trip element rotatably supported in said pocket, said element being fixed to said shaft member for rotation therewith, said trip element having circumferentially spaced shoulders; and a fixed stop lug in the path of movement of said shoulders of said rotary trip element.

11. In a hand brake mechanism, the combination with a member adapted to be rotated to tighten the brakes; of a ratchet wheel rotatable with said member; a sliding locking dog engageable with said ratchet wheel; a lever having a laterally extending shaft member at one end thereof for supporting the lever for swinging movement; a rotary trip element, said dog having a chamber in which said trip element is accommodated, said trip element having circumferentially spaced shoulders, said dog having bearing openings rotatably accommodating said shaft member, one of said openings being laterally enlarged, said trip element having an opening therethrough accommodating said shaft member; a key slot communicating with said opening of the trip element; a fixed stop lug in the path of movement of said shoulders of the rotary trip element; and a key rigid with said shaft member seated in said key slot of the trip element, the enlarged portion of said opening of the dog providing clearance for said key in assembling the parts of the mechanism, rotation of said trip element being limited by engagement of the shoulders thereof with said fixed lug to prevent alignment of the key slot with the enlarged portion of said bearing opening of the dog.

STACY B. HASELTINE.

REFERENCES CITED

The following references are of record in the file of this patent:

UNITED STATES PATENTS

| Number | Name | Date |
|---|---|---|
| 1,512,925 | Haseltine | Oct. 28, 1924 |
| 2,070,017 | Lounsbury | Feb. 9, 1937 |